US007008665B2

(12) United States Patent
Loh et al.

(10) Patent No.: US 7,008,665 B2
(45) Date of Patent: Mar. 7, 2006

(54) NON-BRITTLE DRIED FRUITS AND VEGETABLES

(75) Inventors: Jimbay P. Loh, Green Oaks, IL (US); Yeong-Ching Albert Hong, Kildeer, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 242 days.

(21) Appl. No.: 10/373,429

(22) Filed: Feb. 24, 2003

(65) Prior Publication Data

US 2004/0166228 A1  Aug. 26, 2004

(51) Int. Cl.
*A23L 1/09* (2006.01)
*A23L 1/212* (2006.01)

(52) U.S. Cl. ............ 426/640; 426/72; 426/74; 426/102; 426/103; 426/524; 426/615; 426/638; 426/639

(58) Field of Classification Search ........... 426/615, 426/638, 639, 640, 72, 74, 524, 102, 103
See application file for complete search history.

(56) References Cited

U.S. PATENT DOCUMENTS

| 3,595,681 | A | * | 7/1971 | Kaplow et al. ............ 426/324 |
| 3,623,893 | A | | 11/1971 | Mauge |
| 3,745,027 | A | | 7/1973 | Kaplow et al. |
| 4,096,283 | A | | 6/1978 | Rahman |
| 4,364,968 | A | * | 12/1982 | Waitman et al. ............ 426/639 |
| 4,832,969 | A | | 5/1989 | Lioutas |
| 4,889,730 | A | | 12/1989 | Roberts et al. |
| 4,946,693 | A | | 8/1990 | Risler et al. |
| 4,948,609 | A | | 8/1990 | Nafisi-Movaghar |
| 5,110,609 | A | | 5/1992 | Lewis et al. |
| 5,229,152 | A | | 7/1993 | Meldrum |
| 5,368,873 | A | | 11/1994 | Aebi et al. |
| 5,925,395 | A | | 7/1999 | Chen |
| 5,955,130 | A | | 9/1999 | Gagliardi et al. |
| 6,004,590 | A | | 12/1999 | Subramaniam et al. |
| 6,159,527 | A | | 12/2000 | Wettlaufer |
| 6,183,795 | B1 | | 2/2001 | Yates |
| 6,268,012 | B1 | | 7/2001 | Sikora et al. |
| 6,403,134 | B1 | | 6/2002 | Nayyar et al. |

FOREIGN PATENT DOCUMENTS

| EP | 1009246 | 11/2002 |
| JP | 59/232077 | 6/1983 |
| JP | 11/318375 | 5/1998 |
| WO | WO02/01968 | 1/2002 |

* cited by examiner

*Primary Examiner*—Helen Pratt
(74) *Attorney, Agent, or Firm*—Fitch, Even, Tabin & Flannery

(57) ABSTRACT

This invention relates to non-brittle dried fruits and vegetables, especially non-brittle freeze-dried fruits and vegetables, and methods for preparing such fruits and vegetables. More specifically, this invention relates to non-brittle dried fruits and vegetables prepared by applying a surface coating of an aqueous solution of a polyhydric alcohol (preferably glycerol) prior to drying. Application of the aqueous solution of the polyhydric alcohol prior to drying appears to allow sufficient migration of polyhydric alcohol into the cellular structures, thereby plasticizing the cellular structures and minimizing damage to the cellular structures of the fruits and vegetables during and after drying and post-drying activities. The resulting plasticized product is rendered non-brittle as indicated by a drastic reduction of fines and/or broken pieces after drying and/or packaging, shipping, and storage as compared to conventionally dried fruits and vegetables.

33 Claims, No Drawings

NON-BRITTLE DRIED FRUITS AND VEGETABLES

FIELD OF THE INVENTION

This invention relates to non-brittle dried fruits and vegetables, especially non-brittle freeze-dried fruits and vegetables, and methods for preparing such fruits and vegetables. More specifically, this invention relates to non-brittle dried fruits and vegetables prepared by applying a surface coating of an aqueous solution of a polyhydric alcohol prior to drying. Application of the aqueous solution of the polyhydric alcohol prior to drying appears to allow sufficient surface coating and subsequent migration of polyhydric alcohol into the cellular structure during drying, thereby effectively plasticizing to the cellular structure of the fruits and vegetables. The resulting plasticized product is rendered non-brittle as indicated by a drastic reduction of fines and/or broken pieces during or after drying and/or during handling, packing, shipping, and storage as compared to conventionally dried fruits and vegetables.

BACKGROUND OF THE INVENTION

Dried packaged convenience foods or mixes, such as, for example, soups, casseroles, salads, pasta, rice, cereal, snacks, and the like, are popular. Such foods or mixes frequently contain various types of dehydrated fruits and vegetables (generally with water activities of less than about 0.5 and often less than about 0.4) along with other food components. Such dehydrated vegetables are often prepared using gentle drying conditions (e.g., freeze drying, vacuum drying, and the like) in order to preserve as much as possible the desirable attributes of the fresh fruits and vegetables. Unfortunately, such dehydrated fruits and vegetables (especially high quality, reduced density freeze dried products) tend to be fragile and easily broken due to inevitable stresses (e.g., free fall impact, compression, abrasion, and the like) encountered during handling, packing, and storage, and generally do not resemble their fresh counterparts in terms of color, appearance, and/or texture.

Numerous attempts have been made to prepare dehydrated fruits and vegetables having improved properties. Japanese Patent Publication 1983/000106764 (Jun. 16, 1983) provided a process of drying foods including fruits (e.g., banana, strawberry, and the like) by drying in microwave oven having an electrical field intensity of about 0.01 to about 0.2 W/cm$^2$, irradiated with microwave radiation, and then heated externally with an auxiliary heat source (e.g., hot-air heating, infrared heating, electrical heating) while maintaining the temperature below a specific level (about 98 ° C.) to obtain the dried foods.

Japanese Patent 6,217,683A2 (Aug. 9, 1994) used a process whereby vegetables were cooled to a temperature equal or below freezing temperature, subsequently heated, and dried in hot oil and under vacuum to obtain an improved dry vegetable product.

U.S. Pat. No. 5,955,130 (Sep. 21, 1999) used flash blanching of vegetables in about 100% saturated steam, steam cooking in 35 to 65% saturated steam, and cooking and drying the vegetables by exposure to infrared radiation to obtain a vegetable product particularly useful as a binder, filling, or topping in complex foods.

U.S. Pat. No. 6,004,590 (Dec. 21, 1999) described a process for producing dehydrated vegetables including preparing the vegetables, holding the prepared vegetables for a time and at a temperature from 45 to 70° C. to activate pectinmethylesterase, blanching, and drying. The drying includes exposure to microwave radiation at a pressure below atmospheric pressure.

U.S. Pat. No. 6,268,012 (Jul. 31, 2001) provides a method for producing dried vegetables wherein substantially all of the cells are reportably undamaged and damage to cellular structure is minimized. A gentle, four stage drying process using a temperature of about 60° C. and controlled humidity is used to avoid excessive temperature and humidity differences between the product and the drying medium.

European Patent 1,009,246B1 (Nov. 20, 2002) described a process of treating with pectinmethylesterase and added pectin to improve the firmness of fruits or vegetables which do not possess such enzyme naturally.

Although these methods can provide improved dehydrated vegetables after rehydration ($A_w$ of 0.5 or less), the dehydrated vegetables, regardless of improved drying methods or other treatments, still tend to be brittle and give a powdery, unnatural appearance. In addition, such dehydrated vegetables are susceptible to breakage during handling, packing and shipping.

An alternate method, namely infusion, was developed to produce non-brittle, intermediate moisture vegetables with $A_w$ greater than 0.5 and typically ranging from 0.5 to 0.9. U.S. Pat. No. 3,623,893 (Nov. 30, 1971) used super-atmospheric pressures (i.e., 200 to 4000 psi) to infuse foods, including vegetables, with an aqueous infusion cocktail containing propylene glycol, potassium sorbate, glycerol, and salt. Of course, the use of such high pressures would involve high capital expense if such a system were used commercially.

U.S. Pat. No. 3,745,027 (Jul. 10, 1973) provided a method for cooking vegetables in an infusion, mixture containing, for example, glycerol, salt, propylene glycol, potassium sorbate, and water. For example, diced carrots cooked for 15 minutes in the infusion mixture and then soaked for 6 hours in the infusion mixture were reported to have "acceptable eating qualities and microorganic stability."

U.S. Pat. No. 4,832,969 (May 23,1989) provides improved dried green vegetables using an infusion cocktail containing a polyhydric alcohol, a sugar, an alkaline buffering system or agent (i.e., sufficient to obtain a cocktail pH of about 6 to 8), an inorganic bittering agent (e.g., KCl and/or $MgCl_2$), a surfactant, salt, and an anti-oxidant (e.g., vitamin E, tocopherol, BHA, BHT, or mixtures thereof). After treatment with the infusion cocktail, the vegetable pieces are dried to a water activity of about 0.3 to 0.85 at a temperature of less than about 135° F. The resulting dried green vegetables are reported to have superior color retention for extended time periods even at room temperature storage, superior texture upon rehydration, and excellent rehydration rates.

U.S. Pat. No. 4,889,730 (Dec. 26, 1989) provides a fruit or vegetable snack product prepared by using a sugar soaking step to prevent collapse and shrinkage of the fruit or vegetable pieces during drying, mixing the fruit or vegetables pieces with a foam composition, and drying the resulting agglomerated product.

U.S. Pat. No. 4,946,693 (Aug. 7,1990) provides a process for preparing intermediate moisture vegetables. In this process, vegetables are blanched or cooked, preferably using a microwave oven, and then partially dried (i.e., water content of 45 to 55 percent). The dried vegetables are then dry mixed with salt (and optionally sodium glutamate if the vegetables are not cooked using a microwave oven); an anti-mycotic agent can also be added.

U.S. Pat. No. 4,948,609 (Aug. 14, 1990) provides puffed dried vegetables using an infusion solution containing at least one reducing agent, a proton donor, and a disaccharide in order to prevent discoloration, followed by vacuum drying.

U.S. Pat. No. 5,110,609 (May 5,1992) provides a method for producing intermediate moisture vegetables wherein the vegetables are partially dehydrated to a moisture content of 26 to 60 percent and then stored in an oxygen free atmosphere.

U.S. Pat. No. 5,368,873 (Nov. 29, 1994) provides a method for producing dehydrated vegetables involving immersing the vegetable in a liquid bath containing an osmotic agent capable of infusing into the vegetable tissue and forming an amorphous solid upon drying, removing excess osmotic agent, and then drying. Suitable osmotic agents include monosaccharides, disaccharides, polyalchohols which form solids at room temperature, corn syrups, and mixtures thereof.

U.S. Pat. No. 5,925,395 (Jul. 20, 1999) provides a method for preserving fresh vegetables whereby the vegetables are treated with a preservative solution containing water, calcium ions, and optionally ascorbic acid or erythorbic acid. The resulting vegetables are then stored at a non-freezing temperature less than 20° C. If stored at ambient temperatures, microbial contamination is possible.

Japanese Patent Publication 11-318375 (Nov. 24, 1999) provides a method for producing dried vegetable or fruit products by adding an edible oil or fat and a diglycerol fatty acid monoester to the vegetable or fruit and then drying the mixture.

U.S. Pat. No. 6,159,527 (Dec. 12, 2000) provides a method and apparatus for infusing fruit, including vegetables, using an infusion cocktail containing sugar wherein the flowrate and infusion cocktail are controlled such that the fruit or vegetables are exposed to progressively higher concentrations of sugar of a level only sightly higher than the sugar content of the fruit or vegetables being infused.

International Patent Publication WO 0,201,968A1 provides a method for preparing a substantially dehydrated vegetable product, in particular a herb or aromatic spice, having an $A_w$ of about 0.5 to 0.7 by infusing the vegetables with a substantial quantity of mineral salt, carbohydrate, and/or polyol and drying the infused vegetables.

U.S. Pat. No. 6,403,134 (Jun. 11, 2002) provides a method for preparing intermediate moisture vegetables by (a) infusing vegetables with an antimicrobial infusion cocktail at a temperature of greater than about 50° F. for about 15 to about 180 minutes, wherein the antimicrobial infusion cocktail comprises an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture; (b) collecting the vegetables and removing excess antimicrobial infusion cocktail; (c) drying the collected vegetables to a water activity of about 0.5 to about 0.9 to form the intermediate moisture vegetables; and (d) packaging the intermediate moisture vegetables.

Although these infusion methods can provide intermediate moisture fruits and vegetables with improved mechanical properties (i.e., non-brittle), while maintaining water activities greater than about 0.5, such vegetables typically have less than desirable organoleptic properties. For example, such fruits and vegetables often have a poor, heavy, and/or candy-like appearance and/or undesirable taste profile (e.g., too sweet or salty) due to high levels of humectants. Over-drying of such fruits and vegetables (e.g., water activities less than about 0.5) generally results in hard glassy products with poor hydration characteristics.

Thus, there remains a need for improvements in methods of providing intermediate moisture or infused fruits and vegetables, auspiciously for more delicate fruits and vegetables such as strawberries, broccoli, mushrooms, and the like. The present method, which is both simple and inexpensive, provides such improvements. Indeed, the present method allows the preparation of dried fruits and vegetables which are shelf stable and non-brittle as indicated by a drastic reduction of fines and/or broken pieces after drying and/or storage, shipping, and handling as compared to conventionally dried fruits and vegetables. The present dried fruits and vegetables have improved quality with a more natural color and more intact, natural appearance than conventionally dried fruits and vegetables and improved handling and shipping properties due to increased resistance to fracture or breakage of the individual pieces.

SUMMARY OF THE INVENTION

This invention relates to non-brittle dried fruits and vegetables, especially non-brittle freeze-dried fruits and vegetables, and methods for preparing such fruits and vegetables. More specifically, this invention relates to non-brittle dried fruits and vegetables prepared by applying a surface coating of an aqueous solution of a polyhydric alcohol prior to drying. Application of the aqueous solution of the polyhydric alcohol prior to drying appears to allow sufficient migration of polyhydric alcohol into the cellular structure during drying, thereby effectively plasticizing the cellular structure of the fruits and vegetables. The resulting plasticized product is rendered non-brittle as indicated by a drastic reduction of fines and/or broken pieces after drying and/or storage, shipping, and handling as compared to conventionally dried fruits and vegetables without sacrificing their desirable textural or color attributes associated with the fresh fruits and vegetables. The polyhydric alcohols used in this invention are liquid at ambient temperatures.

DETAILED DESCRIPTION OF THE INVENTION

Non-brittle dried fruits and vegetables are prepared by applying a surface coating of an aqueous solution of a polyhydric alcohol prior to drying. The polyhydric alcohols used in this invention are liquid at ambient temperatures. Application of the aqueous solution of the polyhydric alcohol prior to drying appears to allow sufficient migration of polyhydric alcohol into the cellular structures, thereby plasticizing the cellular structures (especially cellular structures located at, and just below, the exterior surfaces). Migration of the polyhydric alcohol may take place during the initial application period or, and probably to a greater extent, during the drying period. The resulting dried product is rendered non-brittle as indicated by a significant reduction of fines and/or broken pieces after drying and/or handling, shipping, and storage as compared to conventionally dried fruits and vegetables. For purposes of this invention, a "significant reduction in fines and/or broken pieces" is intended to be at least a 30 percent reduction, and preferably at least a 50 percent reduction, in fines as measured in Example 1 as compared to a similarly dried vegetable product which was not exposed to the aqueous solution of the polyhydric alcohol. The aqueous solution can include other components such as, for example, salt, spices, flavorants, nutrients, vitamins, nutraceutical additives, and the like.

The present invention provides a method for producing non-brittle dried fruits and vegetables, said method comprising (1) applying an aqueous solution containing a polyhydric alcohol to the exterior surface of fruits and vegetables to be dried; (2) maintaining the fruits and vegetables and aqueous solution from step (1) for a time and a temperature to allow sufficient polyhydric alcohol to coat the exterior surfaces of the fruits and vegetables; and (3) gently drying the fruits and vegetables from step (2) to a moisture content of less than about 10 percent to obtain the non-brittle fruits and vegetables, wherein the polyhydric alcohol migrates into cellular structures of the fruits and vegetables, wherein the non-brittle fruits and vegetables contain at least about 0.1 percent polyhydric alcohol, and wherein the non-brittle fruits and vegetables are less susceptible to breakage or fracture as compared to comparable fruits and vegetables dried in a comparable manner without application of the aqueous solution containing the polyhydric alcohol. Preferably, the non-brittle fruits and vegetables contain at least about 1 percent polyhydric alcohol.

In a preferred embodiment, the present invention also provides non-brittle dried fruits or vegetables comprising fruits or vegetables which have been freeze dried in the presence of an aqueous solution containing about 1 to about 40 percent of a polyhydric alcohol to form the non-brittle dried fruits or vegetables, wherein the non-brittle dried fruits and vegetables have a moisture content of less than about 10 percent, wherein the non-brittle fruits or vegetables contain at least about 0.1 percent polyhydric alcohol, and wherein the non-brittle fruits or vegetables are less susceptible to breakage or fracture as compared to comparable fruits or vegetables fried dried in a comparable manner without presence of the aqueous solution containing the polyhydric alcohol. Preferably, the non-brittle fruits and vegetables contain at least about 1 percent polyhydric alcohol.

Suitable polyhydric alcohols (i.e., polyols) for use in the present invention include relatively low molecular weight (i.e., less than about 136 g/mole) food grade alcohols having two or more hydroxyl groups, which are liquid at ambient temperatures and have relatively high boiling points (typically higher than about 100° C.). Examples of suitable polyhydric alcohols include such as glycerol (glycerine or 1,2,3-propanetriol), sugar alcohols of the general formula $CH_2OH(CHOH)_nCH_2OH$ where n is 2 to 5, propylene glycol, and the like as well as mixtures thereof. Glycerol is the preferred polyhydric alcohol for use in this invention. Migration of small amounts of the polyhydric alcohols into the cellular structures of the fruits and vegetable prior to and during drying appear to provide a plasticizing effect and thereby rendering the fruits and vegetables non-brittle. The absorbed polyhydric alcohols also appear to keep the fruit and vegetable tissue easily wettable during cooking. Generally, the quantity of absorbed polyhydric alcohol is not expected to be sufficient to lower the water activity to any significant degree.

Generally the aqueous solution contains about 0.1 to about 99 percent polyhydric alcohol, preferably about 1 to about 40 percent polyhydric alcohol, and most preferably about 5 to 25 percent polyhydric alcohol. The preferred polyhydric alcohol is glycerol. In another embodiment, the aqueous solution consists essentially of about 0.1 to about 99 percent polyhydric alcohol, preferably about 1 to about 40 percent polyhydric alcohol, and most preferably about 5 to 25 percent polyhydric alcohol, and at least one ingredient selected from the group consisting of salt, spices, flavorants, nutrients, vitamins, and nutraceutical additives. The aqueous solution may be applied to the surface of the fruits or vegetables using any convenient method. Suitable methods include, for example, spraying, dipping, washing, and the like. In order to minimize the risk microbial growth during the treatment, the aqueous solution can be applied to the fruits or vegetables and used at relatively low temperatures (e.g., refrigeration temperatures below about 5° C.). Generally, the vegetables and aqueous solution are held at reduced temperatures (i.e., below about 20° C., preferably below about 5° C.) for about 5 seconds to about 20 minutes, preferably about 10 seconds to about 2 minutes, to allow the polyhydric alcohol to adhere to the surfaces of the fruits and vegetables and/or migrate into the cellular vegetable structures before drying. Since the treatment time is short, the risk for microbial growth is small, especially if starting with frozen fruits and vegetables. Depending on the starting materials and subsequent processing steps, the treatment conditions (i.e., time and temperature) can vary significantly. For example, if freshly cut, blanched, and cooled fruits and vegetables are used, the polyhydric alcohol solution may be applied immediately after cooling step at or below ambient temperature for a time from 1 to 20 minutes. Optimum treatment time also depends on the concentration of polyhydric alcohol solution, solution temperature, and the type and the dimension of fruits and vegetables. Although not wishing to be limited by theory, it is thought that, especially in case of blanched and cooled fruits and vegetables, the polyhydric alcohol is absorbed through both diffusion and adherence mechanisms. If frozen (e.g., IQF) fruits and vegetables are used, diffusion-type mechanisms may be less important. In such cases, upon contact of polyhydric solution with the frozen fruits and vegetables, a thin frozen layer of polyhydric alcohol solution is expected to rapidly form on the surface of frozen fruits and vegetables. Thus, the treatment time is typically short (e.g., 30 seconds) and treatment temperature is preferably at near freezing point of water. Migration of polyhydric alcohol occurs mainly during subsequent drying process. The range of polyhydric alcohol content in finished, dried, non-brittle fruits and vegetables of the present invention is from about 0.1 to about 60 percent, more preferred from 1 to 30 percent, and most preferred from about 5 to 20 percent.

After the exterior surfaces of the fruits or vegetables are coated with the aqueous solution, the so-treated fruits and vegetables are dried using conventional techniques. During drying as moisture is removed, the polyhydric alcohol slowly migrates into the cellular structure of the fruits and vegetables. Preferred drying techniques involve gentle drying conditions so as to minimize shrinkage damage to the cellular structures and, therefore, enhance the protective benefit offered by the present invention using the polyhydric alcohol as a plasticizer within the cellular vegetable structures.

Especially preferred drying techniques include freeze drying and vacuum drying. Freeze drying is the most preferred drying technique for the present invention. Generally drying is carried out for a time sufficient to reduce the water content of the vegetables to less than about 10 percent, preferably to less than about 5 percent or to achieve a water activity of less than about 0.5, and preferably of about 0.2 to about 0.35. Of course, as those skilled in the art will realize, the water activity or moisture content achieved by drying will be largely determined by the intended use of the dried vegetables.

The aqueous polyhydric alcohol solution may also contain other optional ingredients or components such as, for example, salt, spices, flavorants, nutrients, vitamins, nutraceutical additives, and the like, so long as they do not adversely effect the organoleptic and/or stability properties in a significant manner. Salt tends to balance the taste profile, reduce aftertaste normally associated with glycerol, act as a taste enhancer, and reduce water activity. Suitable vitamins that may be included in the infusion cocktail include, for example, vitamin A, vitamin C, vitamin D, vitamin E, B vitamins, niacin, folate, folic acid, and the like as well as mixtures thereof. Suitable minerals include, for example, salts of metal nutrients, wherein the metals are chosen from among calcium, magnesium, copper, iron, zinc, chromium, and the like as wells as mixtures thereof; salts of inorganic minerals such as, for example, phosphate, sulfate, chloride, and the like as well as mixtures thereof can also be used. Suitable antioxidants include, for example, citric acid, EDTA, tocopherol and the like. Suitable botanicals include, for example St. John's wort, ginseng; ginkgo biloba, and the like as well as mixtures thereof. Of course, as those skilled in the art will realize, other vitamins, minerals, antioxidants, and botanticals can also be used in the present invention. The amount of such optional ingredients can, of course, vary considerably depending on the specific nutrient or mineral added (and its recommended daily requirement) and the targeted consumer. For example, macronuterients (e.g., calcium) can be added at relatively high levels (i.e., up to about 5 percent) whereas other trace minerals, vitamins, and other additives (i.e., generally materials having daily adult requirements in the milligram range or lower) will normally be added at much lower levels.

The process of the present invention may be operated in batch, semi-continuous, or continues mode as desired. Generally, the present process is carried out at ambient pressures. The present invention can be used to prepare a wide variety of fruits and vegetables. Such fruits include, for example, berries of various types, melons of various types, bananas, and the like. Such vegetables include, for example, carrots, various types of peppers, broccoli, various types of peas and pea-pods, cauliflower, onions, tomatoes, mushrooms, zucchini, corn, celery, asparagus, green beans, water chestnuts, bamboo shoots, and the like. Generally, the fruits and vegetables are first cut into appropriate sizes (generally pieces of 1 inch or less in their longest dimension) prior to exposure to the aqueous solution; larger pieces can be used, if desired. Of course, smaller vegetables such as peas and pea-pods can be, and preferably are, used whole without any reduction in size. Both frozen (especially of the IQF type) fruits and vegetables as well as fresh fruits and vegetables can be used in the present invention. The fresh fruits and vegetables used in this invention can be blanched (e.g., cooked in a water bath at about 75° C. or greater for up to about 10 minutes) prior to the treatment process The fruits and vegetables, reduced in size if appropriate, are exposed to the aqueous solution, preferably by coating the exterior surfaces of the fruits and vegetables with the aqueous ,solution. The fruit or vegetable pieces should remain in contact with the aqueous solution at a temperature and for a time sufficient to allow the polyhydric alcohol to coat, and/or infuse into, the internal fruit or vegetable structures. For both blanched and frozen fruits or vegetables, the length of the treatment time should be long enough to render the fruits or vegetables non-brittle after drying as compared to similar conventionally prepared dried fruits or vegetables. For blanched fruit and vegetables, the treatment time generally ranges from about 30 seconds to about 5 minutes to allow sufficient polyhydric alcohol to coat and/or penetrate or migrate into the fruit or vegetable tissue. For frozen fruits and vegetables, the treatment time is generally less than about 30 seconds during which time a thin layer of frozen polyhydric solution can form on the fruit or vegetable surfaces (assuming that the polyhydric solution is sufficiently cool (generally less than about 5° C.) so that it does not significantly thaw the fruits or vegetables); this frozen layer will provide sufficient polyhydric alcohol for later penetration or migration into the fruit or vegetable tissue. Generally, over treatment should be avoided since too high a concentration of polyhydric alcohol and/or too long treatment times can result in excessive shrinkage of the fruits or vegetables due to osmotic dehydration. Additionally, in the case of frozen fruits and vegetables, over treatment can result in a thick layer of frozen polyhydric solution on the surfaces; excess water in such a thick layer must later be removed during the drying stage thereby resulting in increased costs and decreased throughput. Generally, the weight of the fruits or vegetables will generally increase by no more than about 50 percent and preferably about 1 to about 15 percent due to absorption and/or deposition of a thin frozen layer of the aqueous solution. Generally, the concentration of polyhydric alcohol solution, the treatment time, and other conditions should be selected to allow a minimum amount of weight gain while providing sufficient uptake of the polyhydric alcohol. As those skilled in the art will realize, routine experimentation can easily be conducted to determine the optimum treatment times and conditions, including the concentration of the polyhydric solution, for particular fruits and vegetables. The vegetables can be gently agitated during this exposure, especially during the initial stages of the exposure (especially during spray applications), to provide a more uniform uptake of the aqueous solution. Preferably, all of the aqueous solution is taken up or absorbed by the fruits or vegetables. If excess solution is used, the aqueous solution can be reused after re-standardizing its composition by adding make-up ingredients and/or fresh aqueous solution. The present invention can be operated in a batch, semi-continuous, or continuous manner.

Once treatment of the polyhydric alcohol is complete, the vegetables pieces are collected and excess liquid (i.e., aqueous solution), if any, is removed from the outer surfaces of the vegetable pieces. Generally, the excess liquid is removed by draining (with or without gentle agitation) or more active processing techniques such as, for example, compressed gas or air sprays or blades (e.g., passing the vegetable pieces through a sterile air curtain), centrifugation, and the like. Generally, water washes are not necessary or desirable. After the excess liquid (if necessary) is removed, the vegetable pieces are then dried to reduce the water content of the vegetables to less than about 10 percent, preferably to less than about 5 percent, or to achieve a water activity of about less than about 0.5, preferably about 0.2 to about 0.35, using any suitable drying technique to form the dried fruits or vegetables. The fruits or vegetables dried to a water activity of less than about 0.5 as prepared by this invention (and properly packaged) generally have shelf lives of about 12 months or more under ambient conditions. It is generally preferred that gentle drying conditions for relatively short time periods be used in order to maximize the non-brittle nature of the product as well as to prevent case hardening, ensure faster equilibrium after drying, and quick rehydration when cooked or otherwise prepared for consumption.

Generally the dried fruits and vegetables produced by this invention are non-sticky and free flowing. If desired, however, the fruit and vegetable pieces may be treated prior to drying with, for example, release agents such as lecithin, high stability vegetable oils, and emulsions thereof in order to improve handling of the final product. Such a treatment, generally at a level of about 0.1 to 0.5 percent, can reduce surface adhesion and/or dumpiness of the vegetable pieces during and after the drying process (including the final product). Other additives can also be applied with the lecithin and/or high stability vegetable oils. Such additives could include spices, flavorants, nutrients, vitamins, nutraceutical additives, and the like. Alternatively, the lecithin, high stability vegetable oils, and emulsions thereof could also be incorporated in the aqueous polyhydric alcohol solution.

Once dried and cooled, the dried vegetables can be packaged in appropriate containers for bulk storage for later usage or directly for the retail market. The dried fruit and vegetables of the present invention provide improved mechanical stability and, thus, significantly reduced broken pieces and fines even after relatively rough handling. They may be packaged separately or combined with other ingredients before packaging (e.g., meal kits). Preferably, the packaging material is designed to prevent, or at least significantly reduce, color and quality degradation, deterioration, or loss during storage. The dried vegetables can be sealed in oxygen impermeable and light resistant or light proof packaging materials such as, for example, aluminum-polyester film under substantially oxygen-free conditions. Such substantially oxygen-free conditions can be obtained, for example, by inert gas (e.g., $N_2$ or $CO_2$) flushing prior to sealing or using vacuum packing techniques. The resulting dried fruits and vegetables provide shelf stable, high quality fruits and vegetables having, when cooked or rehydrated by the consumer, organoleptic properties similar to high quality fruits and vegetables but significantly improved integrity and appearance.

The following examples are intended to illustrate the invention and not to limit it. Unless otherwise indicated, all percentages using in the present specification are by weight. All patents and other publications cited in the present specification are hereby incorporated by reference.

EXAMPLE 1

This example illustrates the preparation of dried broccoli florets using the process of this invention. IQF broccoli florets (1500 g; about 1 inch size) were divided into three equal samples: Sample 1—control sample with no treatment prior to drying; Sample 2— control sample treated with cold (about 5° C.) water only prior to drying; and Sample 3—inventive sample treated with cold (about 5° C.) aqueous glycerol (about 5 percent) solution. Samples 2 and 3 were prepared by dipping the broccoli florets in the appropriate solution for about 30 seconds. After this initial treatment, each of these samples were stored overnight in a deep freezer (about −40° C.) overnight and then freeze dried (side-by-side to minimize differences in conditions) in a commercial freeze drier. After freeze drying to a moisture content of about 4 percent, the fines in each sample were determined using a US #14 screen (openings about 0.05 inches). The following results were obtained:

|  | Sample 1 | Sample 2 | Sample 3 |
| --- | --- | --- | --- |
| Initial weight (g) | 501.0 | 501.0 | 502.4 |
| Weight (g) after initial treatment | — | 620.8 | 633.7 |
| Weight (g) absorbed in initial treatment | — | 119.8 | 131.3 |
| Weight (g) after freeze drying | 51.6 | 51.2 | 51.2 |
| Overall yield (%) | 10.3 | 10.2 | 10.2 |
| Fines (%) | 2.56 | 2.11 | 0.55 |
| Intact Pieces (%) | 97.44 | 97.89 | 99.45 |

Freeze dried inventive Sample 3 was noticeably less fragile than either of the controls. Inventive Sample 3 had about 78 and about 74 percent less fines, respectively, than Control Samples 1 and 2. Visually, freeze dried inventive Sample 3 was more appealing and had a brighter green color than either of the control samples. Inventive Sample 3 had better hydration characteristics than either of the control samples and similar eating qualities (taste, texture, and other organoleptic properties) as compared to the controls.

EXAMPLE 2

This example illustrates the concentration effect of aqueous glycerol solution on the mechanical properties of dried broccoli florets using the process of this invention. IQF broccoli florets (3500 g; about 1 inch size) were divided into eight equal samples and treated with aqueous solutions of glycerol with glycerol concentrations of 0 (control), 0.1, 1, 5, 10, 15, 20, and 25 percent. Each sample was dipped in the appropriate aqueous glycerol solution (about 5° C.) for about 30 seconds. After this initial treatment, each of the samples were stored overnight in a deep freezer (about −40° C.) and then freeze dried in a commercial freeze drier. After freeze drying to a moisture content of about 4 percent, the fines in each sample were determined using a US #14 screen. Glycerol content of dried broccoli florets was determined. The following results were obtained:

|  | Glycerol Concentration (%) in Aqueous Solution | | | | | | | |
| --- | --- | --- | --- | --- | --- | --- | --- | --- |
|  | 0 | 0.1 | 1 | 5 | 10 | 15 | 20 | 25 |
| Fines (%) | 6.4 | 4.2 | 2.5 | 1.7 | 2.1 | 1.0 | 0.5 | 1.7 |
| Glycerol (%) in Dried Product | 0 | 0.3 | 10 | 16 | 20 | 22 | 26 | 31 |
| Appearance & Texture | pale, powdery, brittle | green, sightly brittle | green, non-brittle | green, non-brittle | green, non-brittle | green, non-brittle | green, non-brittle | dark green, non-brittle |

When the amount of glycerol in dried broccoli is increased, the amount of fines decreases. The appearance and mechanical properties are clearly improved by the treatment of the present invention. Moreover, the improvement is surprisingly observed even at very low glycerol concentrations (e.g., about 0.1%).

EXAMPLE 3

Commercial, freeze dried strawberries, red bell pepper, and mushrooms are well-known for their friability and related problems such as high level of fines and a powdery appearance. The amount of fines in these commercial products (determined using a US#14 screen) can be as high as 10 percent or more as received directly from their producer.

About 500 g of IQF strawberries, diced red bell pepper, and mushrooms were separately treated with chilled 10 percent aqueous glycerol solution for 30 seconds. After this initial treatment, each of these samples were stored overnight in a deep freezer (about −40° C.) and then freeze dried in a commercial freeze drier. After freeze-drying to a moisture content of about 4 percent, the fines in each sample were determined using a US #14 screen. A control for each samples were also similarly prepared except there was no treatment with the aqueous glycerol solution prior to drying. The percent fines of these samples are compared below:

|  | % Fines | |
| --- | --- | --- |
|  | Control | Inventive |
| Strawberries | 2.8 | 0.1 |
| Mushrooms | 3.6 | 0.2 |
| Red bell peppers | 0.9 | 0.0 |

All the three treated samples were rendered non-brittle as indicated by the reduction in fines. In addition, these samples have substantially less fines and much improved appearance than their commercial counterparts.

EXAMPLE 4

Florets of about 1 inch long were obtained from fresh broccoli purchased from local supermarket. After cleaning, blanching in boiling water (about 100° C.) for about 1 minute and cooled in cold water to room temperature (about 20° C.), the broccoli florets were drained to remove excessive surface water and dipped in a 10 percent aqueous glycerol solution for about 30 seconds. Treated sample was stored overnight in a deep freezer (about −40° C.) overnight and then freeze dried in a commercial freeze drier. After freeze drying to a moisture content of about 4 percent, the fines in the dried broccoli were determined using a US #14 screen. The results demonstrated that inventive treatment may be used before or after freezing of the broccoli in preparation for subsequent freeze drying. Only 0.6 percent fines was found in the treated sample. This suggests a further reduction of fines in freeze dried broccoli if the inventive treatment is applied prior to freezing step. In comparison, similarly treated, IQF freeze-dried broccoli has about 2.0 percent fines.

We claim:

1. A method for producing non-brittle dried fruits or vegetables, said method comprising (1) applying an aqueous solution containing a polyhydric alcohol to the exterior surface of the fruits or vegetables to be dried; (2) maintaining the fruits or vegetables and aqueous solution from step (1) for about 10 seconds to about 2 minutes at temperatures below about 20° C. to allow sufficient polyhydric alcohol to coat the exterior surfaces of the fruits and vegetables; and (3) gently drying the fruits and vegetables from step (2) to a moisture content of less than about 10 percent to obtain the non-brittle fruits and vegetables, wherein the polyhydric alcohol migrates into cellular structures of the fruits and vegetables, wherein the non-brittle fruits and vegetables contain at least about 0.1 percent polyhydric alcohol, wherein the non-brittle fruits or vegetables are less susceptible to breakage or fracture as compared to comparable fruits or vegetables dried in a comparable manner without application of the aqueous solution containing the polyhydric alcohol.

2. The method as defined in claim 1, wherein the polyhydric alcohol is selected from the group consisting of glycerol, propylene glycol, sugar alcohols of the general formula $CH_2OH(CHOH)_nCH_2OH$ where n is 2 to 5, and mixtures thereof, and wherein the fruits or vegetables are maintained in the aqueous solution at temperatures below about 5° C.

3. The method as defined in claim 1, wherein the aqueous solution contains about 0.1 to about 99 percent polyhydric alcohol.

4. The method as defined in claim 2, wherein the aqueous solution contains about 0.1 to about 99 percent polyhydric alcohol.

5. The method as defined in claim 1, wherein the aqueous solution contains about 1 to about 40 percent polyhydric alcohol.

6. The method as defined in claim 2, wherein the aqueous solution contains about 1 to about 40 percent polyhydric alcohol.

7. The method as defined in claim 5, wherein the polyhydric alcohol is glycerol.

8. The method as defined in claim 6, wherein the polyhydric alcohol is glycerol.

9. The method as defined in claim 1, wherein the fruits or vegetables are gently dried using freeze drying.

10. The method as defined in claim 5, wherein the fruits or vegetables are gently dried using freeze drying.

11. The method as defined in claim 6, wherein the fruits or vegetables are gently dried using freeze drying.

12. The method as defined in claim 1, wherein the aqueous solution consists essentially of about 1 to about 40 percent polyhydric alcohol and at least one ingredient selected from the group consisting of salt, spices, flavorants, nutrients, vitamins, and nutraceutical additives.

13. The method as defined in claim 1, wherein the non-brittle dried fruits or vegetables contains about 0.1 to about 60 percent polyhdric alcohol.

14. The method as defined in claim 2, wherein the non-brittle dried fruits or vegetables contains about 0.1 to about 60 percent polyhdric alcohol.

15. The method as defined in claim 13, wherein the non-brittle dried fruits or vegetables contains about 1 to about 30 percent polyhdric alcohol.

16. The method as defined in claim 14, wherein the non-brittle dried fruits or vegetables contains about 1 to about 30 percent polyhdric alcohol.

17. The method as defined in claim 15, wherein the non-brittle dried fruits or vegetables contains about 5 to about 20 percent polyhdric alcohol.

18. The method as defined in claim 16, wherein the non-brittle dried fruits or vegetables contains about 5 to about 20 percent polyhdric alcohol.

19. A method for producing non-brittle dried fruits or vegetables, said method comprising (1) applying an aqueous solution containing about 1 to about 40 percent of a polyhydric alcohol to the exterior surface of the fruits or vegetables to be dried; (2) maintaining the fruits or vegetables and aqueous solution from step (1) for about 10 seconds to about 2 minutes at temperatures below about 20° C. to allow sufficient polyhydric alcohol to migrate into cellular structures of the fruits or vegetables; and (3) freeze drying the fruits or vegetables from step (2) to a moisture content of less than about 10 percent to obtain the non-brittle fruits or vegetables, wherein the non-brittle fruits or vegetables contain at least about 0.1 percent polyhydric alcohol, and wherein the non-brittle fruits or vegetables are less susceptible to breakage or fracture as compared to comparable fruits or vegetables dried in a comparable manner without application of the aqueous solution containing the polyhydric alcohol.

20. The method as defined in claim 19, wherein the polyhydric alcohol is selected from the group consisting of glycerol, propylene alcohol, sugar alcohols of the general formula $CH_2OH(CHOH)_nCH_2OH$ where n is 2 to 5, and mixtures thereof, and wherein the fruits or vegetables are maintained in the aqueous solution at temperatures below about 5° C.

21. The method as defined in claim 20, wherein the polyhydric alcohol is glycerol.

22. The method as defined in claim 19, wherein the aqueous solution contains about 5 to about 25 percent polyhydric alcohol.

23. The method as defined in claim 20, wherein the aqueous solution contains about 5 to about 25 percent polyhydric alcohol.

24. The method as defined in claim 21, wherein the aqueous solution contains about 5 to about 25 percent polyhydric alcohol.

25. The method as defined in claim 19, wherein the non-brittle dried fruits or vegetables contains about 0.1 to about 60 percent polyhdric alcohol.

26. The method as defined in claim 20, wherein the non-brittle dried fruits or vegetables contains about 0.1 to about 60 percent polyhdric alcohol.

27. The method as defined in claim 25, wherein the non-brittle dried fruits or vegetables contains about 1 to about 30 percent polyhdric alcohol.

28. The method as defined in claim 26, wherein the non-brittle dried fruits or vegetables contains about 1 to about 30 percent polyhdric alcohol.

29. The method as defined in claim 27, wherein the non-brittle dried fruits or vegetables contains about 5 to about 20 percent polyhdric alcohol.

30. The method as defined in claim 28, wherein the non-brittle dried fruits or vegetables contains about 5 to about 20 percent polyhdric alcohol.

31. Non-brittle dried fruits or vegetables comprising fruits or vegetables which have been freeze dried in the presence of an aqueous solution containing about 1 to about 40 percent of a polyhydric alcohol to form the non-brittle dried fruits or vegetables, wherein the fruits or vegetables are contacted with the aqueous solution and maintained in the aqueous solution for about 10 seconds to about 2 minutes at a temperature below about 20° C. prior to being freeze-dried, and wherein the non-brittle fruits or vegetables are less susceptible to breakage or fracture as compared to comparable fruits or vegetables freeze dried in a comparable manner without presence of the aqueous solution containing the polyhydric alcohol.

32. The non-brittle dried fruits or vegetables as defined in claim 31, wherein the non-brittle dried fruits or vegetables contains about 2 to about 30 percent polyhydric alcohol.

33. The non-brittle dried fruits or vegetables as defined in claim 32, wherein the non-brittle dried fruits or vegetables contains about 5 to about 20 percent polyhydric alcohol.

* * * * *

UNITED STATES PATENT AND TRADEMARK OFFICE
CERTIFICATE OF CORRECTION

PATENT NO. : 7,008,665 B2  Page 1 of 1
APPLICATION NO. : 10/373429
DATED : March 7, 2006
INVENTOR(S) : Loh et al.

It is certified that error appears in the above-identified patent and that said Letters Patent is hereby corrected as shown below:

- In column 12, claim 13, line 54, delete "polyhdric", and insert -- polyhydric --.

- In column 12, claim 14, line 57, delete "polyhdric", and insert -- polyhydric --.

- In column 12, claim 15, line 60, delete "polyhdric", and insert -- polyhydric --.

- In column 12, claim 16, line 64, delete "polyhdric", and insert -- polyhydric --.

- In column 12, claim 17, line 67, delete "polyhdric", and insert -- polyhydric --.

- In column 13, claim 18, line 3, delete "polyhdric", and insert -- polyhydric --.

- In column 14, claim 25, line 3, delete "polyhdric", and insert -- polyhydric --.

- In column 14, claim 26, line 6, delete "polyhdric", and insert -- polyhydric --.

- In column 14, claim 27, line 9, delete "polyhdric", and insert -- polyhydric --.

- In column 14, claim 28, line 12, delete "polyhdric", and insert -- polyhydric --.

- In column 14, claim 29, line 15, delete "polyhdric", and insert -- polyhydric --.

- In column 14, claim 30, line 18, delete "polyhdric", and insert -- polyhydric --.

- In column 14, claim 31, line 27, after "dried," insert -- wherein the non-brittle dried fruits and vegetables have a moisture content of less than about 10 percent, wherein the non-brittle fruits or vegetables contain at least about 0.1 percent polyhydric alcohol --.

Signed and Sealed this

Fifth Day of December, 2006

JON W. DUDAS
*Director of the United States Patent and Trademark Office*